United States Patent [19]

Yamada et al.

[11] Patent Number: 4,831,473
[45] Date of Patent: May 16, 1989

[54] DUST DOOR MECHANISM IN TAPE PLAYER

[75] Inventors: Kimichika Yamada; Yukio Ito; Hiroyuki Ohkawa, all of Tokyo, Japan

[73] Assignee: Clarion Co., Ltd., Tokyo, Japan

[21] Appl. No.: 223,712

[22] Filed: Jul. 21, 1988

Related U.S. Application Data

[63] Continuation of Ser. No. 100,184, Sep. 23, 1987, abandoned.

[30] Foreign Application Priority Data

Sep. 30, 1986 [JP] Japan ................................ 61-232208

[51] Int. Cl.⁴ ............................................. G11B 15/00
[52] U.S. Cl. ..................................... 360/96.5; 360/93
[58] Field of Search ................. 360/96.5, 85, 93, 96.6

[56] References Cited

U.S. PATENT DOCUMENTS

| | | | |
|---|---|---|---|
| 4,533,966 | 8/1985 | Kume | 360/96.5 |
| 4,628,383 | 12/1986 | Miyamoto | 360/96.5 |
| 4,655,057 | 4/1987 | Derman | 360/93 X |
| 4,673,994 | 6/1987 | Hida | 360/85 |

*Primary Examiner*—John H. Wolff
*Attorney, Agent, or Firm*—Flynn, Thiel, Boutell & Tanis

[57] ABSTRACT

A dust door mechanism in a tape player includes a dust door wider than a cassette insertion aperture, and a cassette holder which includes a major part narrower than the dust door and a front end defining a door accepting portion wider than the dust door.

3 Claims, 1 Drawing Sheet

DUST DOOR MECHANISM IN TAPE PLAYER

This application is a continuation of U.S. Ser. No. 100 184, filed Sept. 23, 1987 now abandoned.

FIELD OF THE INVENTION

This invention relates to a dust door provided at a cassette insertion aperture of an audio, VTR or other cassette tape player.

BACKGROUND OF THE INVENTION

An escutcheon ES of a tape player has a cassette insertion aperture which is covered by a dust door to protect the interior of the tape player against dust. The dust door is configured to rotate into the interior of the tape player to open the aperture when a cassette is pushed thereinto. It is necessary to ensure that the rotated dust door never hits a cassette holder which is provided at the back of the escutcheon to accept the cassette inserted into the aperture. In this connection, a prior art arrangement uses a dust door having a width smaller than that of the cassette holder so that the dust door, when rotated, enters into the cassette holder and does not hit it.

The prior art arrangement is explained below, referring to FIG. 3. A dust door 12 is supported by right and left side walls 11—11 of the tape player pivotably about a shaft 13. The dust door 12 is biased by a spring 14 outwardly of the tape player to contact a stopper 11a provided at a front end of the side wall 11. The dust door 12 is smaller in width than a cassette holder 15 disposed in the interior of the tape player, so that the dust door 12 can enter within the width of the cassette holder when the dust door 12 is rotated into the interior of the tape player about the shaft 13. Outside the dust door 12 is located a cassette insertion aperture E provided in the escutcheon.

The cassette insertion aperture must have a width large enough to ensure smooth insertion of a cassette. That is, the width is necessarily wider than that of the cassette holder. Therefore, the dust door 12 narrower than the cassette holder 15 cannot fully shut the cassette insertion aperture E, and gap $l_1$ exists between the dust door 12 and the cassette insertion aperture E. Obviously, this arrangement cannot protect the interior of the tape player effectively against dust.

OBJECT OF THE INVENTION

It is therefore an object of the invention to provide a dust door mechanism in a tape player having a dust door which is wide enough to completely shut the cassette insertion aperture of the escutcheon, and never hit the cassette holder at the back of the escutcheon when rotated into the interior of the tape player.

SUMMARY OF THE INVENTION

In a dust door mechanism including a dust door provided between the back face of an escutcheon and the front face of a cassette holder in a tape player and configured to rotate about a shaft toward the cassette holder, the invention provides an improvement wherein said dust door has a width larger than that of a cassette insertion aperture provided in said escutcheon; and said cassette holder includes a major part having a width smaller than that of said dust door and includes a door accepting portion formed at the front end portion thereof opposed to said dust door, said door accepting portion having a width larger than that of said dust door.

With this arrangement, since the door accepting portion wider than the dust door is provided at the front end portion of the cassette holder, the dust door wider than the remainder part of the cassette holder and wider than the cassette insertion aperture of the escutcheon can enter in the door accepting portion when rotated into the interior for the tape player, and never hits the cassette holder itself. The wide dust door can completely shut the cassette insertion aperture to effectively protect the interior of the tape player against dust.

DETAILED DESCRIPTION

Figure 1:
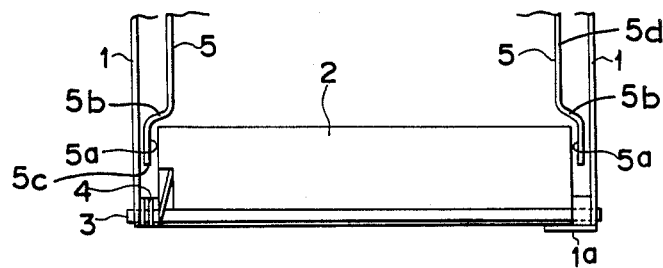
FIG. 1 is a plan view showing an embodiment of a dust door mechanism according to the invention in which a dust door is in an open position.

The invention is described below in detail, referring to a preferred embodiment illustrated in FIGS. 1 and 2.

A dust door 2 is supported by right and left side walls 1—1 pivotably about a shaft 3. The dust door 2 is biased by a spring 4 toward a stopper 1a extending from the front end of the side wall 1. The width of the dust door 2 is wider than that of a cassette insertion aperture E of an escutcheon ES of the tape player.

A cassette holder 5 is provided at the back of the dust door 2. The major part of the cassette holder 5 has a width between parallel first side wall portions 5b which is large enough to hold a cassette, i.e. small enough to slidably accept the cassette, as in the prior art mechanism. Therefore, the width of the major part of the cassette holder 5 is narrower than the width of the dust door 2. However, the cassette holder 5 has a front end portion in which the right and left side walls are expanded outwardly at 5b so that parallel second portions thereof define a door accepting portion 5a which is wider than the dust door 2.

Figure 2:
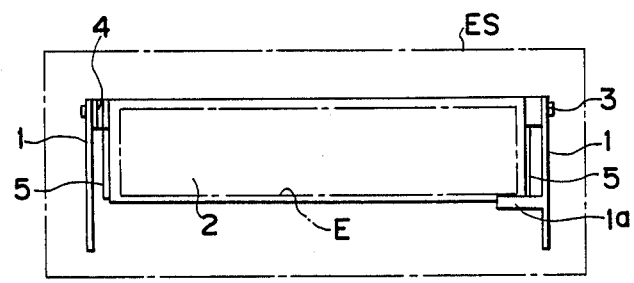
FIG. 2 is a front elevation of the same mechanism but with the dust door in a closed position.
Figure 3:
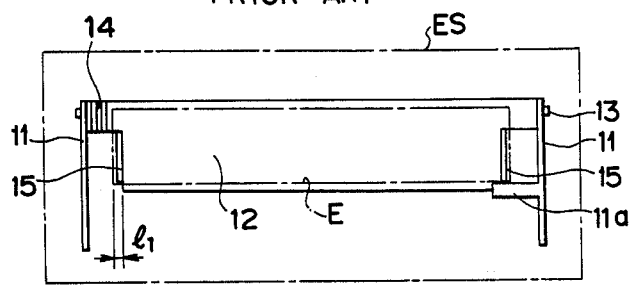
FIG. 3 is a front elevation of a prior art dust door mechanism.

With this arrangement, the dust door 2 wider than the major part of the cassette holder 5 or wider than the cassette insertion aperture E of the escutcheon ES can rotate beyond the front end 5c of cassette holder 5 into the door accepting portion 5a as shown in FIG. 1 when rotated into the interior of the tape player by a cassette inserted through aperture E, and never hits the cassette holder 5. Therefore, the dust door can be wide enough to fully shut the cassette insertion aperture E of the escutcheon ES.

The side walls of the door accepting portion are preferably continuous to the side walls of the major part of the cassette holder via angled or tapered portions so as to ensure smooth insertion of a cassette into the cassette holder.

As described above, using such a simple arrangement that the wide door accepting portion is formed at the front end of the cassette holder, the invention can fully shut the cassette insertion aperture by the sufficiently wide dust door to effectively protect the interior of the tape player against dust.

What is claimed is:

1. In a dust door mechanism for a tape player, including an escutcheon having a cassette insertion aperture, including a cassette holder disposed behind said escutcheon, and including a dust door which is provided between a back face of said escutcheon and a front face of said cassette holder, which is normally in a closed position extending across and substantially obstructing said aperture, and which is supported for pivotal movement about an axis from said closed position in a direction toward said cassette holder to an open position in which said aperture is exposed, wherein a tape cassette inserted into said cassette insertion aperture can pivot said dust door from its closed position to its open position, and wherein said holder is configured to receive a tape cassette inserted through said aperture, the improvement comprising wherein said dust door has a width in one direction which is larger than a width of said cassette insertion aperture in said one direction, and wherein said cassette holder has two side walls between which an inserted cassette is received, includes a major part which is spaced from said front face thereof and is defined by first portions of said side walls which are spaced in said one direction by a distance smaller than said width of said dust door, and includes a door accepting portion which is adjacent said front face thereof and is defined by second portions of said side walls which are spaced in said one direction by a distance larger than said width of said dust door, wherein as said dust door pivots to its open position, a portion thereof moves into said door accepting portion of said cassette holder between said second portions of said side walls.

2. The mechanism of claim 1, including a shaft which is supported adjacent said escutcheon and is coaxial with said axis, said dust door being pivotally supported on said shaft.

3. The mechanism of claim 2, wherein said shaft extends parallel to said one direction.

* * * * *